United States Patent
Brown et al.

(10) Patent No.: US 9,071,655 B2
(45) Date of Patent: Jun. 30, 2015

(54) MANAGING ACCESS TO DIGITAL CONTENT SOURCES

(75) Inventors: Scott K. Brown, Sterling, VA (US); Keith Peters, San Carlos, CA (US); David L. Biderman, San Francisco, CA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/615,375

(22) Filed: Sep. 13, 2012

(65) Prior Publication Data

US 2013/0066958 A1    Mar. 14, 2013

Related U.S. Application Data

(62) Division of application No. 10/697,804, filed on Oct. 31, 2003, now Pat. No. 8,291,062.

(60) Provisional application No. 60/496,386, filed on Aug. 20, 2003.

(51) Int. Cl.
   G06F 15/16      (2006.01)
   H04L 29/08      (2006.01)

(52) U.S. Cl.
   CPC .................................. H04L 67/322 (2013.01)

(58) Field of Classification Search
   None
   See application file for complete search history.

(56) References Cited

U.S. PATENT DOCUMENTS

| | | |
|---|---|---|
| 5,774,669 A | 6/1998 | George et al. |
| 5,956,716 A | 9/1999 | Kenner et al. |
| 5,987,376 A | 11/1999 | Olson et al. |
| 6,003,030 A | 12/1999 | Kenner et al. |
| 6,119,163 A | 9/2000 | Monteiro et al. |
| 6,263,371 B1 * | 7/2001 | Geagan et al. ................ 709/231 |
| 6,282,653 B1 | 8/2001 | Berstis et al. |
| 6,286,058 B1 | 9/2001 | Hrastar et al. |
| 6,339,785 B1 | 1/2002 | Feigenbaum |
| 6,477,522 B1 | 11/2002 | Young |
| 6,754,699 B2 | 6/2004 | Swildens et al. |
| 6,785,704 B1 | 8/2004 | McCanne |
| 6,795,858 B1 | 9/2004 | Jain et al. |
| 6,832,253 B1 | 12/2004 | Auerbach |
| 6,910,064 B1 | 6/2005 | Astarabadi et al. |
| 6,951,030 B2 | 9/2005 | Hirai et al. |
| 6,959,333 B2 | 10/2005 | Beaumont et al. |
| 6,970,939 B2 | 11/2005 | Sim |
| 7,010,598 B2 * | 3/2006 | Sitaraman et al. ............ 709/224 |

(Continued)

FOREIGN PATENT DOCUMENTS

JP         2003-108393 A         4/2003

OTHER PUBLICATIONS

Rodriquez, Pablo et al., "Dynamic Parallel Access to Replicated Content in the Internet," *IEEE/ACM Transactions on Networking*, vol. 10, No. 4, IEEE Press, pp. 456-465 (Aug. 2002).

(Continued)

*Primary Examiner* — Jeffrey R Swearingen
(74) *Attorney, Agent, or Firm* — Finnegan, Henderson, Farabow, Garrett & Dunner LLP

(57) ABSTRACT

Access to content may be enabled by receiving an instruction indicating a client request to access content, accessing a list of content sources capable of rendering the content for which access is requested by the client, determining a performance metric for at least two of the content sources, and selecting among the content sources based on the performance metric to identify a content source to be accessed by the client.

14 Claims, 5 Drawing Sheets

(56) References Cited

U.S. PATENT DOCUMENTS

| | | | |
|---|---|---|---|
| 7,076,552 B2 | 7/2006 | Mandato | |
| 7,133,368 B2 | 11/2006 | Zhang et al. | |
| 7,133,922 B1 | 11/2006 | She et al. | |
| 7,216,154 B1 * | 5/2007 | Chow et al. | 709/219 |
| 7,274,658 B2 * | 9/2007 | Bornstein et al. | 370/227 |
| 7,441,261 B2 * | 10/2008 | Slater et al. | 709/219 |
| 7,475,132 B2 * | 1/2009 | Chang et al. | 709/223 |
| 7,555,542 B1 * | 6/2009 | Ayers et al. | 709/223 |
| 7,555,559 B2 | 6/2009 | Chapweske | |
| 2001/0053944 A1 | 12/2001 | Marks et al. | |
| 2002/0083346 A1 | 6/2002 | Rowlands | |
| 2002/0163882 A1 | 11/2002 | Bornstein et al. | |
| 2003/0074418 A1 | 4/2003 | Coker | |
| 2003/0112262 A1 | 6/2003 | Adatia et al. | |
| 2003/0198184 A1 | 10/2003 | Huang et al. | |
| 2005/0172028 A1 | 8/2005 | Nilsson et al. | |

OTHER PUBLICATIONS

Office Action for U.S. Appl. No. 10/747,675, Mailed Dec. 15, 2005 (17 pages).

Office Action for U.S. Appl. No. 10/747,675, Mailed Mar. 31, 2006 (17 pages).

Office Action for U.S. Appl. No. 10/747,675, Mailed Mar. 1, 2007 (17 pages).

Office Action for U.S. Appl. No. 10/747,675, Mailed Aug. 28, 2007 (16 pages).

Office Action for U.S. Appl. No. 10/747,675, Mailed Dec. 26, 2007 (18 pages).

Office Action for U.S. Appl. No. 10/747,675, Mailed May 8, 2008 (17 pages).

Office Action for U.S. Appl. No. 10/747,675, Mailed Nov. 18, 2008 (24 pages).

"FAQs" Welcome to the Winamp Frequently Asked Questions, Nullsoft, copyright 2003, reprinted on Dec. 9, 2005, 5 pages.

Research and Design of a Mobile Streaming Media Content Delivery Network. Wee et al., Multimedia and Expo, 2003, vol. 1, Jul. 6-9, 2003 URL:http//ieeexplore.ieee.org/iel5/8655/274333/01220840. pdf?isnumber=27433&prod=STD&arnumber=1220840&arST=+1 &ared=+5-8+vol.1&arAuthor=Wee%2C+S. %3B+Apostolopoulos%2C=J.%3B=Wai-tan+Tan%3B+Roy%2C+S.

On Multiple Description Streaming with Content Delivery Networks. Apostolopoulos, J. et al. INFOCOM 2002. Twenty-First Annual Joint Conference of the IEEE Computer and Communications Societies. vol. 3, 2002, pp. 1736-1745.

URL for Citation V: URL:http//ieeexplore.ieee.org/iel5/7943/21923/ 01019427.pdf?isnumber=21923&prod=STD&arnumber=1019427 &arnumber=1019427&arST=+1736&ared=+1745+vol.3 &arAuthor=Apostolopoulos%2C+J.%3B+Wong%2C+T. %3B+Wai-tian+Tan%3B+Wee%2C+S.

Office Action for U.S. Appl. No. 10/747,675, mailed May 31, 2006, 17 pages.

\* cited by examiner

MANAGING ACCESS TO DIGITAL CONTENT SOURCES

CROSS-REFERENCE TO RELATED APPLICATIONS

This application is a division of U.S. application Ser. No. 10/697,804, filed Oct. 31, 2003 (now U.S. Pat. No. 8,291,062) and claims priority to U.S. Provisional Application No. 60/496,386, filed Aug. 20, 2003, and titled "Managing Access to Digital Content Sources," all of which are expressly incorporated herein by reference to their entireties.

TECHNICAL FIELD

This document relates to managing access to digital content sources.

BACKGROUND

Digital content is distributed on a wide variety of devices and in a wide variety of formats. Digital content frequently includes one or more of movies, music, slides, games and other forms of electronic content.

SUMMARY

In one general sense, access to content may be enabled by receiving an instruction indicating a client request to access content, accessing a list of content sources capable of rendering the content for which access is requested by the client, determining a performance metric for at least two of the content sources, and selecting among the content sources based on the performance metric to identify a content source to be accessed by the client.

Implementations may include one or more of the following features. For example, the content source selected may be accessed. Communications exchanged with the content source selected may be monitored to determine a selected connection state to determine whether an alternate content source should be accessed.

The determining and selecting may be repeated when the selected connection state indicates that the alternate content source should be accessed. The state of content sources not selected from within the list of content sources may be monitored so that the alternate content source may be accessed when the connection state indicates that the alternate content source should be accessed. Receiving the list of content sources may include receiving the list of content sources from a host. Receiving the list of content sources may include receiving the list of content sources in response to authenticating. Determining the performance metric may include polling at least two of the content sources with a polling request. Polling the content sources with the polling request may include transmitting a stream request to each of the content sources in the list of content sources.

Determining the performance metric may include identifying a first content source with a response to the polling request that is received before other responses are received from other content sources in the list of content sources. Determining a performance metric may include identifying a first client able to sustain an identified throughput rate or identifying a content source with a highest throughput rate. Identifying the first client able to sustain the identified throughput rate may include identifying the first client able to sustain the identified throughput rate for a specified duration. Determining the performance metric may include ranking at least two content sources. The ranking may be used to select a backup content source when the content source selected experiences an interrupt condition. A relative ranking may be maintained by transmitting subsequent polling requests to the content sources not selected. A connection to one or more content sources not selected from among the list of content sources may be maintained while accessing the content source selected. One of the content sources not selected may be selected when access to the content source selected is determined to be inferior to access available using the content source that is accessed.

DETAILED DESCRIPTION

Figure 1:
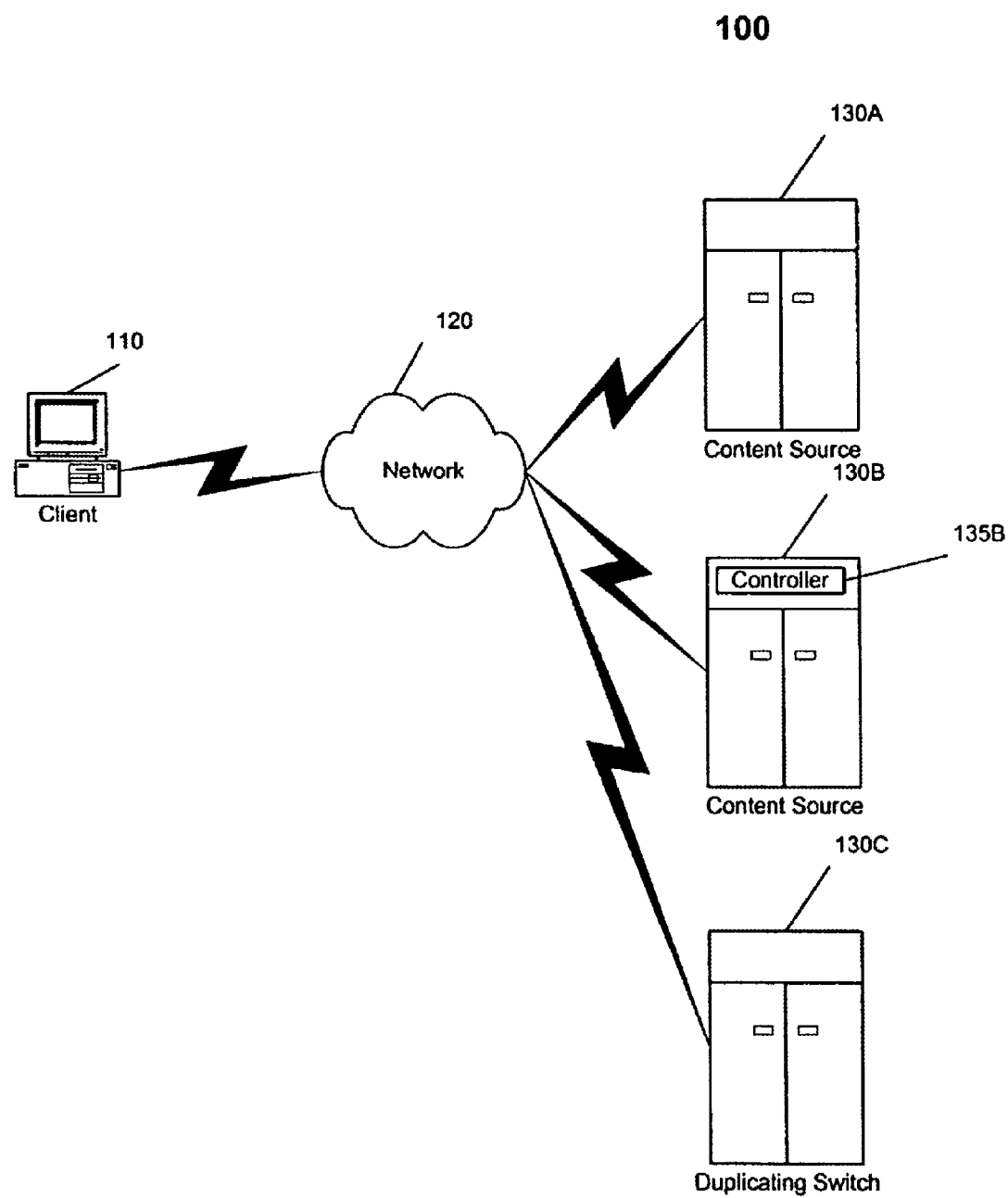
FIG. 1 is a block diagram of an exemplary communications system configured to enable a client to use a network to access one of several content sources in accessing content.

A content provider desires to provide their customers with the best-possible user experience. One factor in providing the best user experience is presenting material in a relatively quick manner without suffering interruption. While a content provider may seek to provide high performance without interruption by encoding content at an appropriate rate and by positioning its content sources logically proximate to its users, the best efforts of the content source may be undermined by other sources of difficulties that challenge the content provider in providing the best-possible user experience. For example, it may be difficult for the content provider to account for or react to adverse network conditions occurring between the content source and the client device. Put differently, the content source may not understand how the communications system operates from the client perspective. For this and/or other reasons, a better user experience may be provided by enabling the client to determine and operate in a manner to realize the best user experience.

In one implementation of this approach, a client may respond to an instruction or a user-inspired request by requesting access to or selecting among one or more content sources. The client may access a list of content sources capable of rendering the content for which access is requested, poll at least two of the content sources with a polling request, and identify a performance metric for the at least two content sources. Based on the performance metric, the client may select among the content sources to identify a primary content source (e.g., generally the best content source from among those identified) to be accessed by the client. The client then may access the primary content source, and subsequently may access one or more of the backup content sources._

Applying this implementation to video streams, a client requesting access to a video stream initially retrieves a list of streaming servers from a management device. The client then may request the video stream from each of the streaming servers, which respond to the requests by transmitting the stream to the client.

As a result of transmitting the streaming request to multiple devices, the client will likely receive multiple instances of the same requested stream at different moments in time. The times at which the streams are received may vary by milliseconds. Irrespective of the variation, the client may identify the streaming server that responds first as the streaming server to provide the content, ultimately disconnecting from the other streaming servers.

In other implementations, the client may maintain relative performance metrics between the streaming servers by continually polling the nonselected streaming servers. The client may transition to a different streaming server when the relative performance metrics indicate that a different streaming server would provide a better user experience. As part of the monitoring, the user may maintain alternate network connections to other streaming servers and use the alternate connections when access to the selected streaming server becomes problematic.

FIG. 1 is a block diagram of an exemplary communications network 100 configured to enable a client 110 to use a network 120 to select one of several content sources (e.g., from a group that includes content source 130A, content source 130B, and duplicating switch 130C). Generally, the client 110 is configured to select a preferred content source from a list of content sources (e.g., a list of addresses with address information for content sources 130A, 130B, and duplicating switch 130C). Specifically, the client 110 polls the content sources with a polling request, and identifies a performance metric for at least one of the content sources. The performance metric then is used to select one of the content sources.

The client 110 typically includes a computing device enabling a user to exchange information over a communications network. The client 110 may include one or more devices capable of accessing content residing on content sources 130A, 130B, and duplicating switch 130C. The client 110 may include a controller (not shown) that processes instructions received from or generated by a software application, a program, a piece of code, a device, a computer, a computer system, or a combination thereof, which independently or collectively direct operations of the client 110. The instructions may be embodied permanently or temporarily in any type of machine, component, equipment, storage medium, or propagated signal that is capable of being delivered to the client 110 or that may reside with the controller at client 110. Client 110 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, client 110 may include a wireless telephone running a micro-browser application on a reduced operating system with general purpose and specialized hardware capable of operating in mobile environments.

The client 110 may include one or more media applications. For example, the client 110 may include a software application that enables the client 110 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite.

The network 120 typically includes hardware and/or software capable of enabling direct or indirect communications between the client 110 and content sources 130A, 130B, and duplicating switch 130C. As such, the network 120 may include a direct link between the client 110 and content sources 130A, 130B, and duplicating switch 130C, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

Content sources 130A, 130B, and duplicating switch 130C generally include one or more devices configured to distribute digital content. Typically, a content source includes a collection or library of content for distribution. Alternatively, or in addition, the content source may convert a media source (e.g., a video or audio feed) into a first feed of data units for transmission across the network 120. The content source may include a general-purpose computer having a central processor unit (CPU), and memory/storage devices that store data and various programs such as an operating system and one or more application programs. Other examples of a content source include a workstation, a server, a special purpose device or component, a broadcast system, other equipment, or some combination thereof capable of responding to and executing instructions in a defined manner. The content source also may include an input/output (I/O) device (e.g., video and audio input and conversion capability), and peripheral equipment such as a communications card or device (e.g., a modem or a network adapter) for exchanging data with the network 120.

Content sources 130A, 130B, and duplicating switch 130C are generally capable of executing instructions under the command of a controller (shown for content source 130B as controller 135B). The content sources typically are similar in that each of the content sources in the group that includes content sources 130A, 130B, and duplicating switch 130C may be used to provide content to the client 110. For illustrative purposes, the operation of content sources 130A, 130B, and duplicating switch 130C will be described with respect to content source 130A. Thus, aspects of the description of content source 130A may be applicable to description of content sources 130B and duplicating switch 130C. A group of content sources is shown to illustrate that the client 110 may interface with several content sources in selecting one of the content sources. While the content sources may include similar or even identical components, applications, data, and configuration information, content sources 130A, 130B, and duplicating switch 130C need not be identical.

The controller 135B may be implemented by a software application loaded on the content source 130A for commanding and directing communications exchanged with the client 110. Other examples of the controller 135B include a program, a piece of code, an instruction, a device, a computer, a computer system, or a combination thereof, for independently or collectively instructing the client 110 or the content source 130A to interact and operate as described. The content source 130A may be embodied permanently or temporarily in any type of machine, component, physical or virtual equipment, storage medium, or propagated signal capable of providing instructions to the client 110 or the content source 130A.

The content source may include a duplicating switch 135C. Generally, a duplicating switch 135C includes a device that performs network operations and functions in hardware (e.g., in a chip or part of chip). In some implementations, the duplicating switch 135C may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch 135C may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch 135C also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

Figure 2:
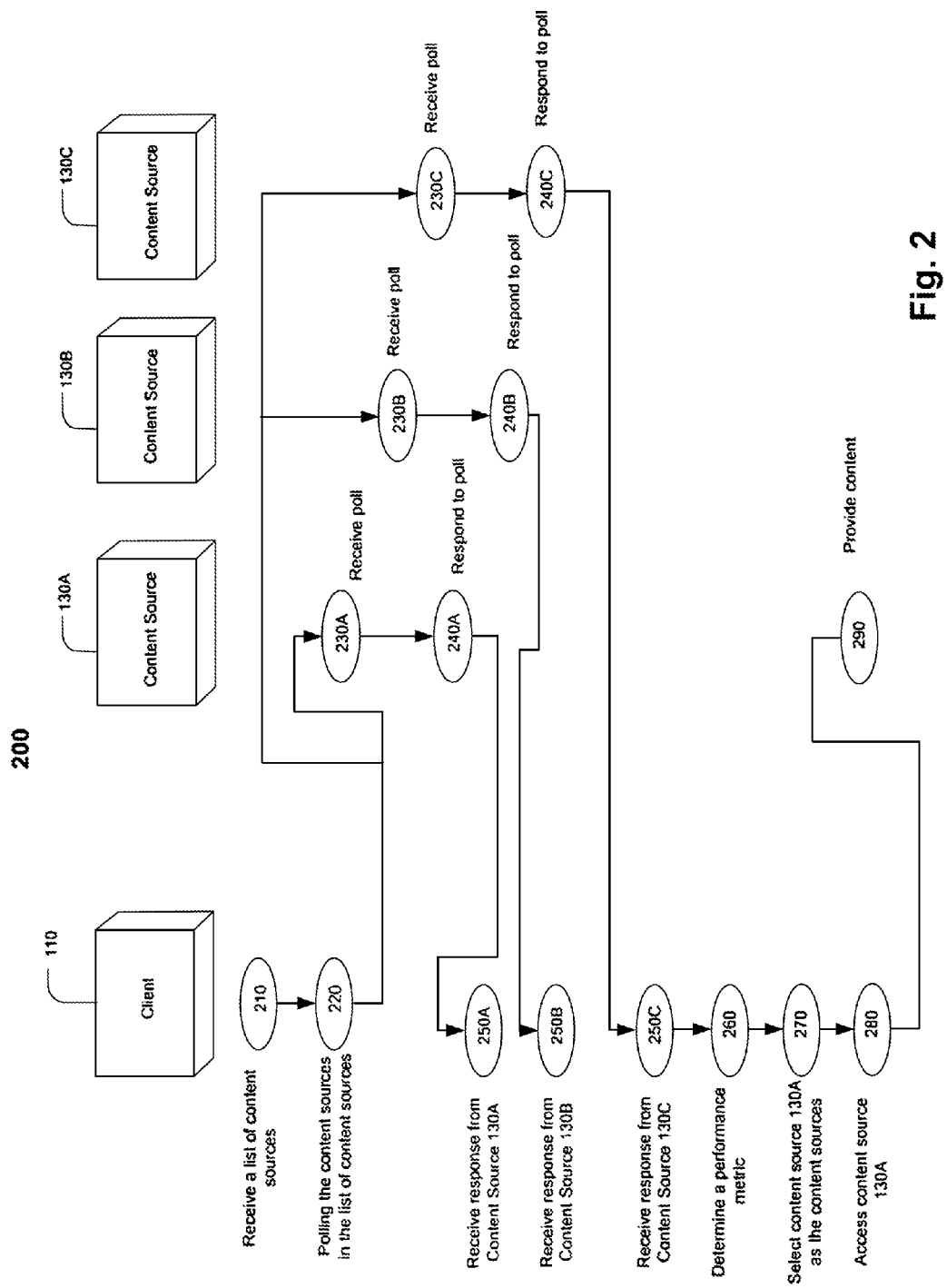
FIG. 2 is a flow chart illustrating an exemplary process by which a client accesses one of several available content sources capable of delivering requested content.

Referring to FIG. 2, a flow chart 200 illustrates an exemplary process by which a client 110 accesses a content source by selecting one of several available content sources. The systems shown in FIG. 2 relate to the systems described previously with respect to FIG. 1. Generally, a client 110 receives an instruction indicating that the client 110 is accessing a content source, a list of content sources is received, the content sources in the list are polled, a performance metric for at least one of the content sources is identified/determined, and one of the content sources is selected, based on the performance metrics identified/determined.

More specifically, the client 110 receives a list of content sources in response to requesting access to a stream (210). Receiving the list of content sources may include polling a management device to receive to receive a list of streaming devices operable to support the client 110. In one example, the client 110 updates the list of content sources when the client is authenticated. In another example, the list of content sources is updated when a media player application is launched. In yet another example, the list of content sources may be statically configured.

The client 110 polls the list of content sources (220) by, e.g., transmitting a stream request to multiple content sources, or transmitting a PING ("Packet Internet Gopher") or system status request to identify of a content source.

Content sources 130A, 130B, and 130C receive the polling request (230A, 230B, and 230C), and respond to the polling request (240A, 240B, and 240C). In one example, responding to the polling request may be performed automatically in response to receiving the polling request. For example, a server may automatically respond to a PING by transmitting a PING response, or a HTTP ("Hyper Text Transfer Protocol") request by establishing a TCP ("Transport Control Protocol") connection to exchange a web page. In another example, responding to a polling request may include ascertaining a state for the content source. Thus, the content source may determine that the content source is operating at 80% capacity. The client 110 may use this information to select the content source operating at 80% capacity before selecting a content source operating at 100% capacity.

As is shown in the flow chart 200, the operations in FIG. 2 represent a sequence of operations. In one sense, the flow chart 200 may represent a timeline indicating the relative instant in which the operations shown are performed. For example, as is shown by the cascaded structure, content source 130A receives the polling request before content source 130B, which in turn receives the polling request before content source 130C. Similarly, content source 130A responds to the polling request before content source 130B, which in turn responds to the polling request before content source 130C. The different communications may be exchanged and the different operations may be performed at different times for a number of reasons. In one example, a network link may be operating at an excessive level of utilization, resulting in a longer time required to exchange a packet across the network link. In a second example, a first content source may be located a further distance away than a second content source. The distance may be an actual distance, or the distance may be a network/logical distance (e.g., the number of network hops, or the network cost between the source and destination). In a third example, the difference in time received/performed may relate to a different utilization and capacity at which the content source is operating.

In any event, regardless of the source of the timing disparity, the client initially receives a response, presumably from all three content sources, and in the example of FIG. 2, from content source 130A (250A), followed by content source 130B (250B), and then content source 130C (250C).

As a result of receiving the responses, the client 110 identifies a performance metric (260), which may include identifying the first content source to respond, identifying the content source with the highest throughput rate, and/or identifying the content source operating at the lowest utilization.

To illustrate, exemplary performance metrics and selection processes will be used to illustrate how different performance metrics and selection algorithms cause the client to select a different content source. For example, the client 110 may request content from the three content sources (content source 130A, content source 130B, and content source 130C). As is shown in FIG. 2, the content source 130A is the first content source to respond, followed by the content source 130B, and the content source 130C. Thus, a performance metric directed to identifying the first-to-respond content source may generate a rank-ordered list of content source indicating the order in which responses from the content sources were received. Alternatively, a first-to-respond performance metric may record the elapsed time for a content source to respond, or the elapsed time between generating a request to access a content source and receiving the response. Thus, an exemplary performance metric for the content sources shown in FIG. 1 may include a list that reads content source 130A (110 milliseconds), content source 130B (120 milliseconds), and content source 130C (130 milliseconds).

Identifying the highest throughput rate also may be identified and used as a performance metric. To use a throughput rate as a performance metric, a client 110 may initially request content from multiple content sources. The client 110 then downloads the requested content for a specified duration and determines the throughput rate by dividing the amount of content downloaded by the elapsed time of the download. In one implementation, the content is downloaded as quickly as possible, without respect to the bit rate of the requested content where the content source does not regulate the bit rate of the content. In FIG. 2, using throughput rate as a performance metric may include determining that content source 130A has a throughput rate of 50 kilobits per second, content source 130B has a throughput rate of 80 kilobits per second, and content source 130C has a throughput rate of 60 kilobits per second.

Additional variations on determining the throughput rate may be determined. For example, the client 110 may account for initial variations associated with activating a communications session by measuring the performance metric once content has actually been exchanged instead of requested, or after an initial period has expired (e.g., a connection setup time). Other variations may include using statistical process control techniques to eliminate abnormal variations from the pool of data used to determine the throughput rate and/or identifying the first content source to support a predetermined sustained throughput.

Yet another performance metric may include determining utilization as a performance metric. The performance metric may include network and/or processor utilization. For example, using network utilization as a performance metric may include determining that an intermediary link between a client 110 and a content source 130 is operating at 95% utilization, causing devices relying on the intermediary link to experience difficulties. The 95% utilization may be compared against other links operating at 50% utilization. At lower levels of network utilization, the utilization for a particular link may be less significant than the clock rate of the transmission (e.g., 100 Mbps). However, at higher utilizations or among links/paths of equivalent bandwidth, using the network utilization as a performance metric may be determinative. To determine network utilization, the client may identify routers along the path between the content source and the client 110. The client 110 then may poll the routers to determine the network utilization for links along the path used by the client 110.

Measuring utilization as a performance metric also may include processor utilization. For example, a content source may be controlled by a processor that manages and responds to content requests, retrieves and serves content, and/or implements routing algorithms used by the content source. The client 110 may select the content source operating at a lower level of utilization to reduce the likelihood of a content source operating at or beyond its capacity, which in turn may cause a fault condition, a failure, or interfere with a client's access. Thus, when requesting content from a content source, the client 110 may poll the content source to determine the processor utilization. Thus, the client 110 may use performance metrics indicating that the content source 130A is operating at 70% utilization; the content source 130B is operating at 65% utilization; and the content source 130C is operating at 30% utilization. The utilization also may be measured with respect to the relative load a content source imposes on a client. For example, if selecting a first content source requires less processor resources than a second content source, the first content source may be selected.

Using the previous performance metric examples, when the performance metric is based upon the first-to-respond content source, the content source 130A is selected because the response from content source 130A was received first in 110 milliseconds vs. 120 and 130 milliseconds for the content sources 130B and 130C, respectively. When the performance metric is based upon the throughput rate, the content source 130B is selected because the content source 130B supports a higher throughput rate of 80 kilobits/second vs. 50 and 60 kilobits/second for the content sources 130A and 130C, respectively. When the performance metric is based upon processor utilization, the content source 130C is selected because the content source 130C is operating at 30% utilization vs. 70% and 65% for the content sources 130A and 130B, respectively.

These and other performance metric may be used in conjunction with other performance metrics to determine if the value for the performance metric is significant in light of other variables. For example, when content source 130A has a response time of 110 milliseconds relative to a response time of 120 milliseconds for content source 130B, the relative response time may be deemed less important than the fact that the cost-per connection is twice as high for content source 130A. Accordingly, content source 130B may be selected under these conditions and performance metrics.

Using the performance metric corresponding to first to respond, the client 110 selects content source 130A (270). As a result, the client 110 accesses the content source 130A (280), which in turn provides content (290).

Figure 3:
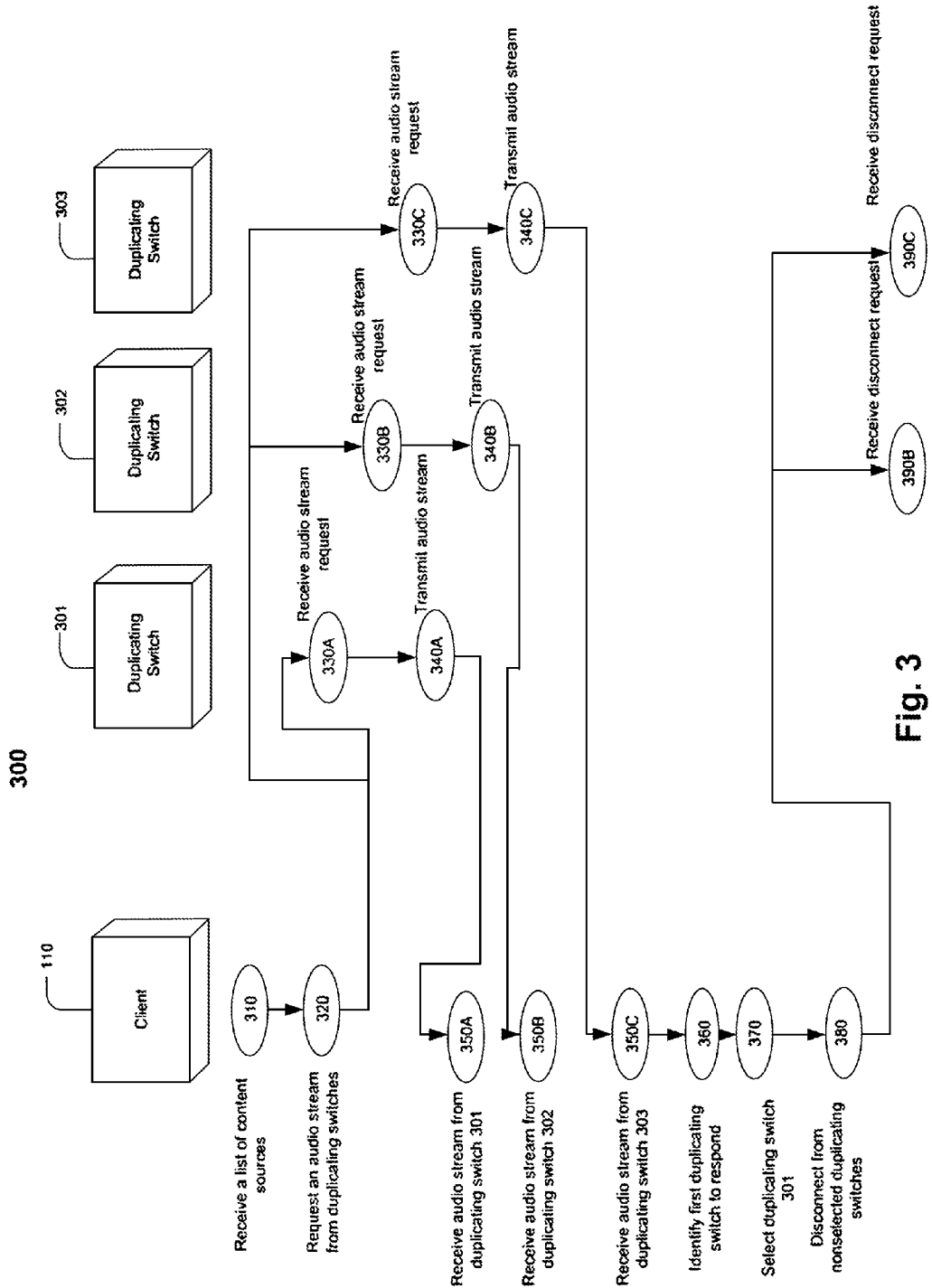
FIG. 3 is a flow chart illustrating an exemplary process by which a client may interface with multiple duplicating switches to access a stream of content.

Referring to FIG. 3, a flow chart 300 illustrates an exemplary process by which a client 110 interfaces with multiple duplicating switches to access a stream of content. Generally, the systems and operations shown in FIG. 3 relate to the systems and operations described previously with respect to FIGS. 1-2. Specifically, duplicating switches 301, 302, and 303 are examples of content sources described as one implementation of a content source. Flow chart 300 illustrates how a stream request may be used as the polling request and also how identifying the first duplicating switch to respond may be used as the performance metric.

Initially, the client 110 receives a list of content sources (310). The client 110 requests an audio stream from duplicating switches appearing in the list of content sources (320). Duplicating switches 301, 302, and 303 receive the audio stream request at different times in operations 330A, 330B, and 330C. Receiving the audio stream request may include receiving a stream and time code identifier indicating an audio selection to be accessed along with a track time indicating the temporal location where the audio selection may be accessed. In response, duplicating switches 301, 302, and 303 transmit the audio stream at different times in operations 340A, 340B, and 340C.

The client 110 initially receives the audio stream from duplicating switch 301 (350A), followed by duplicating switch 302 (350B), and finally by duplicating switch 303 (350C). The client 110 identifies duplicating switch 301 as the first duplicating switch to respond (360). As a result, duplicating switch 301 is selected (370). Note that the client 110 may already be receiving and playing the audio stream from duplicating switch 301 as a result of duplicating switch being the first duplicating switch to respond. This may include "playing" or downloading the audio stream even before the response has been received from the other duplicating switches. In another example, selecting duplicating switch 301 may include completing the connection establishment operations so that the audio stream may be accessed.

The client 110 disconnects from the nonselected duplicating switches (380). Duplicating switches 301 and 302 receive the disconnect requests in 390B and 390C, and disconnect from the client 110.

Figure 4:
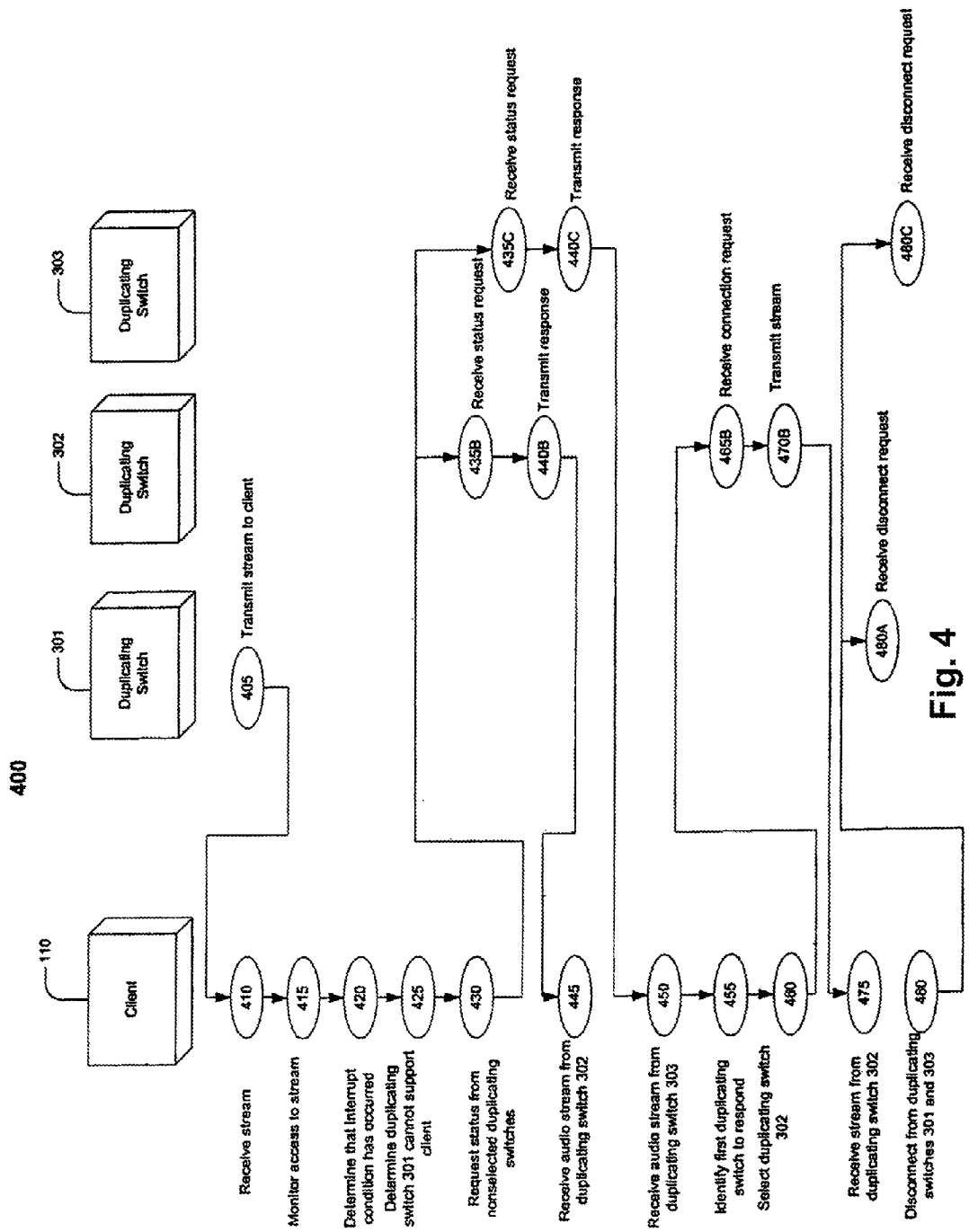
FIG. 4 is a flow chart illustrating an exemplary process by which a client may respond to an interrupt condition that occurs while accessing a stream.

Referring to FIG. 4, a flow chart 400 is shown illustrating an exemplary process by which a client 110 may respond to an interrupt condition that occurs while accessing a stream using the multiple content sources described previously. The operations described previously in FIG. 2 relate to how a content source in a group of several content sources may be selected. The operations described in FIG. 3 illustrate how responding first can be one performance metric used in identifying a content source. FIG. 4 illustrates how even after a content source has been selected, the operations previously performed and the previously determined results may be used to identify one of several content sources in the event of an interruption. Generally, the systems and operations shown in FIG. 4 relate to the systems and operations described previously with respect to FIGS. 1-3. However, the flow chart 400 illustrates how the client 110 may transition to nonselected duplicating switches when the client monitors access to the stream and determines that an interrupt condition has occurred or will be occurring.

Initially, duplicating switch 301 transmits a stream to the client (405), which in turn receives the stream (410). This may include selecting duplicating switch 301 using the operations described previously in FIGS. 2 and 3.

The client monitors access to the stream (415). Monitoring the stream may include determining that the client 110 is experiencing a fault condition (e.g., a client or content source underrun), or that access to duplicating switch 310 has been severed. Generally, a client underrun indicates that the client is unable to receive the content due to a fault in the network between the content source and the client, while the content source underrun indicates that the content source is unable to provide the content requested by the client. As a result of monitoring the stream, the client 110 determines that an interrupt condition has occurred (420). Note that determining that an interrupt condition has occurred may include detecting an interrupt condition before a user perceives the interrupt condition. For example, the client 110 may store 30 ("thirty") seconds of content in a buffer that presents content even while network access to duplicating switch 301 has been interrupted.

As a result of the interrupt condition, the client 110 determines that duplicating switch 301 cannot support the client 110 (425). As a result, the client 110 requests the status of the nonselected duplicating switches (430), which in turn receives the status requests at two different times (435B and 435C). Duplicating switches 302 and 303 respond to the status requests by transmitting the response to the client 110 (440B and 440C). The client 110 initially receives the status response from duplicating switch 302 (445), and then from duplicating switch 303 (450). The client 110 identifies duplicating switch 302 as the first duplicating switch to respond (455), and selects duplicating switch 302 (460).

Duplicating switch 302 receives a connection request (465B) and transmits the stream (470B). The client 110 receives the stream (475), and disconnects from duplicating switches 301 and 303 (480), which in turn receive the disconnect requests and disconnect (480A and 480C).

Figure 5:
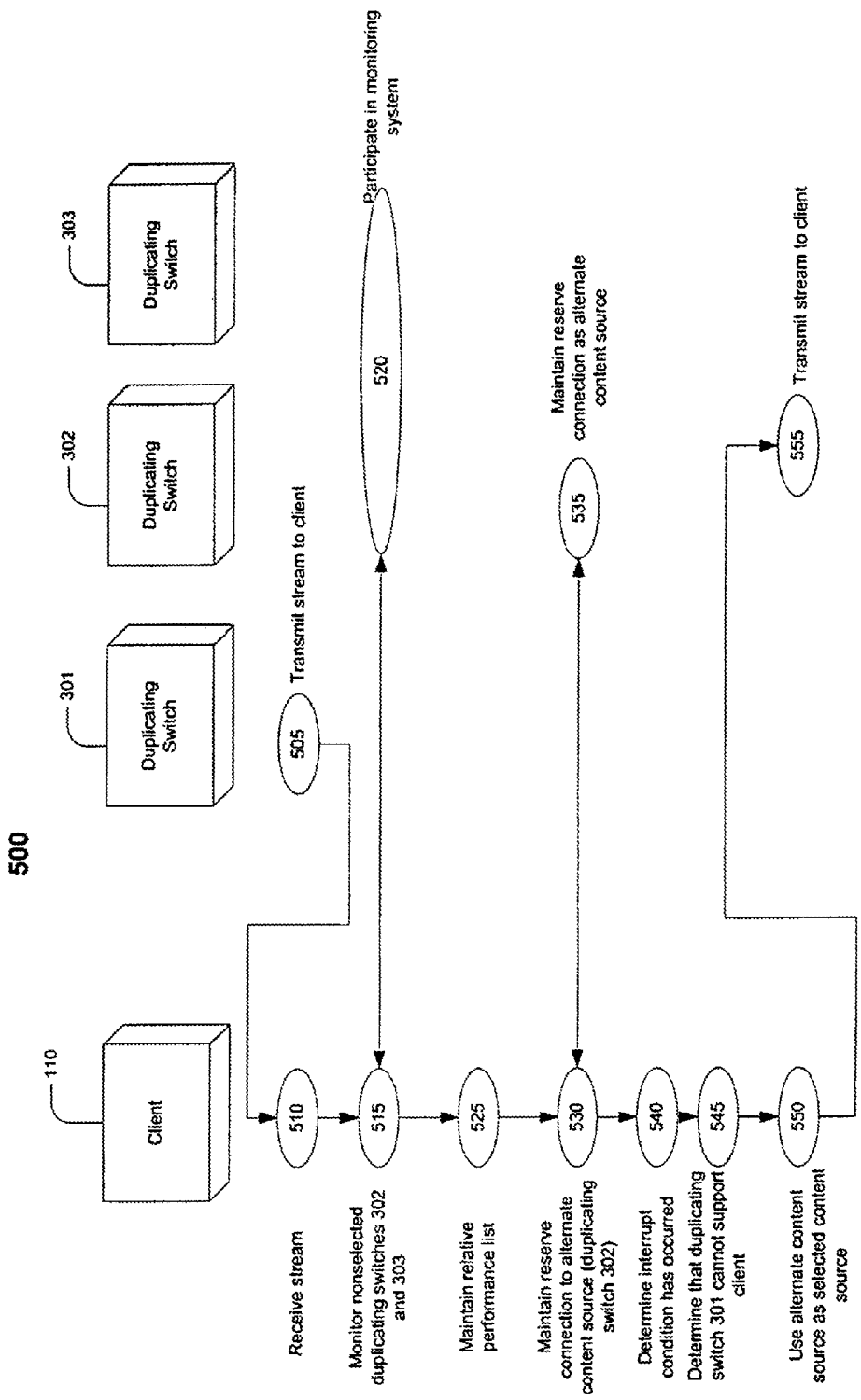
FIG. 5 is a flow chart illustrating an exemplary process by which a client may transition to an alternate duplicating switch when the client determines that another duplicating switch may provide better performance than a selected duplicating switch.

FIG. 5 is a flow chart 500 illustrating an exemplary process by which a client 110 may transition to an alternate duplicating switch when the client 110 determines that another duplicating switch may provide better performance or a better user experience than the selected duplicating switch. Generally, the systems and operations shown in flow chart 500 relate to the systems and operations described previously with respect to FIG. 5.

Initially, duplicating switch 301 transmits a stream to the client 110 (505), which in turn receives the stream (510). Duplicating switch 301 may receive the stream as a result of performing the operations described previously with respect to FIGS. 2-4. The client 110 monitors the nonselected duplicating switches 302 and 303 (515). Duplicating switches 302 and 303 participate in the monitoring system. Monitoring the nonselected duplicating switches may include maintaining a connection with a management agent on the duplicating switches, transmitting PINGs to monitor device or network status, or transmitting stream requests to the duplicating switches. Alternatively, monitoring the nonselected duplicating switches may include using the performance metrics described previously (e.g., utilization, response times, and throughput). As a result of the monitoring, the client 110 maintains a relative performance list (525). Maintaining the relative performance list may include assessing the relative performance of the available duplicating switches. To prepare for an interrupt condition, the client 110 maintains a reserve connection to an alternate content source (530), which in this example is duplicating switch 302 (535). In one example, the reserve connection is maintained when duplicating switch 302 is identified as the best-performing alternative. In one example, maintaining the alternate content source includes maintaining a network connection between the client 110 and duplicating switch 302. In another example, maintaining the reserve connection includes intermittently exchanging a stream to confirm that the performance of the reserve connection.

The client 110 determines that an interrupt condition has occurred (540), and determines that duplicating switch 301 cannot support the client 110 (545). The client 110 then may use the alternate content source as the content source selected. Specifically, the reserve connection to duplicating switch 303 is used to transmit the stream to client 110 (555).

Other implementations are within the scope of the following claims. For example, other factors and variables may be used in identifying a performance metric used to select a content source. For example, the client 110 may be provided with a set of relative costs for the content sources and/or the networks used to access the content sources. The client 110 then may use the relative costs in deciding which content source to select. For example, the client may initially identify the content sources sufficient to provide a quality user experience. The client then may select the content source associated with the lowest relative cost. Of course, the relative costs need not be provided in financial terms. For example, the cost may be provided as a relative numerical value or score. The client 110 then may be allowed to select the content source associated with the lowest score that provides a quality user experience.

The content source need not provide identical content or streams. For example, in the endeavor to provide the best user experience, the client may poll different content sources with different content. Although the client may prefer one of the content sources or streams as matching a demographic profile associated with a user of the client 110, the client 110 may select a different content source with a slightly different demographic profile if the different content source provides a better user experience.

A detailed diagnostic history may be used to present a list of content sources likely to provide better performance. For example, a client may use a reporting mechanism to indicate the performance of a content source and/or network while the content source was accessed. If the user experienced better performance with a content source, the content source will be favored as a preferred source for inclusion and/or selection in subsequent access. If the content source did not perform favorably, the content source may be removed from the list of content sources. The reporting mechanism may use a scoring system deciding whether to favor or disfavor a content source. If a content source provides better performance at a specified favorable ratio, the content source may continue to be used even if the content source provides a poor user experience. In another example, if the content source provides a poor user experience of sufficient severity or frequency, the content source may be removed from the list of content sources.

What is claimed is:

1. A computer-implemented method for a client to acquire content, the method comprising the following operations performed by at least one processor:
   receiving, by the client, a set of sources that host the content;
   sending, by the client, a request for the content to each of the sources;
   receiving, by the client, a response to the request for the content from each of the sources;
   establishing the source with the shortest response time, based on the received response, as a primary source of the content for the client;
   playing back, by the client, the content over a connection between the client and the primary source;
   establishing, from the set of sources, a secondary set of sources of the content for the client;
   maintaining, by the client, one or more connections between the client and one or more of the secondary set of sources while the content is played back;
   receiving, by the client, identical portions of the content from the primary source over the connection with the primary source and from the one or more of the secondary set of sources over the one or more maintained connections;
   determining, by the client, one or more performance metrics for the primary source and the secondary sources based on the received identical portions of the content; and
   selecting, by the client, a new primary source based on the performance metrics.

2. The method of claim 1 wherein the content comprises an audio or video stream.

3. The method of claim 1 wherein determining the one or more performance metrics includes ranking at least two sources whose performance metrics were determined.

4. The method of claim 1 wherein determining the one or more performance metrics includes determining a rate at which the client receives the identical portions of the content from the primary and the secondary sources.

5. The method of claim 1 wherein determining the one or more performance metrics includes beginning measurement of at least one of the one or more performance metrics once the content is received.

6. The method of claim 1 wherein determining the one or more performance metrics includes beginning measurement of at least one of the one or more performance metrics once an initial time period has expired.

7. The method of claim 1 wherein the identical portion is less than all of the content.

8. A client for acquiring content, the client comprising:
   a processor; and
   a non-transitory computer-readable medium storing a set of instructions for execution by the processor to perform the following operations:
      receiving, by the client, a set of sources that host the content;
      sending, by the client, a request for the content to each of the sources;
      receiving, by the client, a response to the request for the content from each of the sources;
      establishing the source with the shortest response time, based on the received response, as a primary source of the content for the client;
      playing back, by the client, the content over a connection between the client and the primary source;
      establishing, from the set of sources, a secondary set of sources of the content for the client;
      maintaining, by the client, one or more connections between the client and one or more of the secondary set of sources while the content is played back;
      receiving, by the client, identical portions of the content from the primary source over the connection with the primary source and from the one or more of the secondary set of sources over the one or more maintained connections;
      determining, by the client, one or more performance metrics for the primary source and the secondary sources based on the received identical portions of the content; and
      selecting, by the client, a new primary source based on the performance metrics.

9. The client of claim 8 wherein the content is an audio or video stream.

10. The client of claim 8 wherein determining the performance metrics includes ranking at least two sources whose performance metrics were determined.

11. The client of claim 8 wherein determining the one or more performance metrics includes determining a rate at which the client receives the identical portions of the content from the primary and the secondary sources.

12. The client of claim 8 wherein determining the one or more performance metrics includes beginning measurement of at least one of the one or more performance metrics once the content is received.

13. The client of claim 8 wherein determining the one or more performance metrics includes beginning measurement of at least one of the one or more performance metrics once an initial time period has expired.

14. The client of claim 8 wherein the identical portion is less than all of the content.

* * * * *